(No Model.)

J. F. SCHULHOFF.
GUN CLEANER.

No. 552,450. Patented Dec. 31, 1895.

Witnesses:
C. H. Rader
K. F. Matthews

Inventor
John F. Schulhoff
By James J. Sheehy
Attorney

United States Patent Office.

JOHN F. SCHULHOFF, OF NEW BREMEN, OHIO.

GUN-CLEANER.

SPECIFICATION forming part of Letters Patent No. 552,450, dated December 31, 1895.

Application filed September 10, 1895. Serial No. 562,088. (No model.)

*To all whom it may concern:*

Be it known that I, JOHN F. SCHULHOFF, a citizen of the United States, residing at New Bremen, in the county of Auglaize and State of Ohio, have invented certain new and useful Improvements in Rifle-Cleaners; and I do declare the following to be a full, clear, and exact description of the invention, such as will enable others skilled in the art to which it appertains to make and use the same.

My invention relates to improvements in gun-cleaning implements, and its novelty and advantages will be fully understood from the following description and claim, when taken in conjunction with the accompanying drawings, in which—

Figure 1:
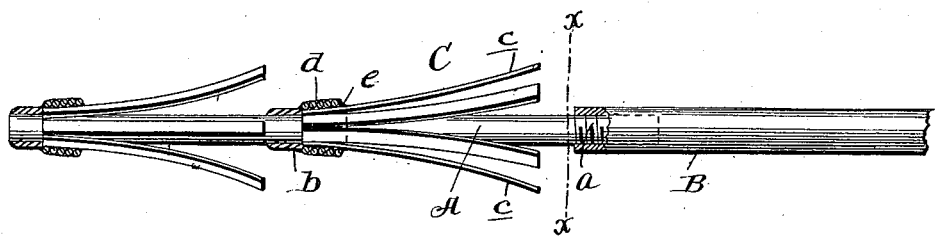
Figure 2:
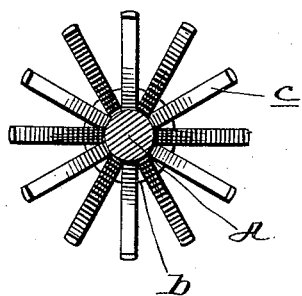

Figure 1 is a side elevation, partly in section, of a gun-cleaner embodying my invention; and Fig. 2 is an enlarged transverse section taken in the plane indicated by the line *x x* of Fig. 1.

Referring by letter to said drawings, A indicates the shank of my improved implement, which is connected with the handle-rod B by threads *a*, or in any other suitable manner, and C indicates the barrel-scrapers, of which there are preferably two employed, they being arranged about the proportional distance illustrated apart. These scrapers C, respectively, comprise a thimble *b*, which is secured by solder or other suitable means upon the shank A; a plurality of flat, resilient or spring scraping-fingers *c*, which have their free portions bent or curved outwardly or away from the shank A, so as to engage the wall of a gun-barrel; a fine wire *d*, which is wrapped tightly around the inner portions of the fingers so as to clamp the same upon the shank A, and a covering *e* of solder which serves to hold the wire wrapping in place, and also serves to connect the inner portions of the fingers *c* together and to the shank A and thimble *b*, so as to securely hold said fingers *c* with respect to the shank A. It will be observed that the fingers *c*, being flat or of a rectangular form in cross-section, may be securely connected to the shank by the wire wrapping and solder and will not be likely to turn or work loose, which is a desideratum.

My improved implement is adapted for cleaning the interior of all kinds of gun and rifle barrels, but is especially designed for cleaning those barrels which are interiorly grooved in the direction of their length. The fingers *c* of one scraper C are arranged in alignment with the spaces between the fingers *c* of the other scraper, as shown in Fig. 1, and when the implement is used for cleaning grooved barrels it is introduced so that the ends of the fingers of one scraper will move in the grooves of the barrel, while the ends of the fingers of the other scraper will move in paths between the grooves in the barrel. By reason of this and the fact that the ends of the fingers are square with respect to the sides thereof and press against the wall of the barrel it will be observed that when the implement is moved up and down in the barrel it will scrape all the lead, rust, and dirt off the wall of the same, and such lead, rust, and dirt may then be discharged by simply inverting the barrel.

In using the implement it will be observed that by reason of the lower ends of the fingers *c* being connected to the shank A, and the fingers curving outwardly from the shank, the implement may be readily inserted in a gun-barrel or rifle-barrel, and it will also be observed that while the fingers *c* will exert a pressure against the wall of the barrel sufficient to remove lead, rust, and dirt therefrom they will not scratch or otherwise injure or weaken the barrel, which is a desideratum.

When the free ends of the fingers *c* which do the scraping become dull from use, they may be readily sharpened by filing the ends of the fingers *c* square with respect to the sides and edges thereof.

It will be appreciated from the foregoing that while very cheap and simple my improved cleaning implement is very efficient for the purposes stated, is not easily broken or worn out, and embodies no parts which are likely to get out of order after short use.

In the practice of the invention, if desired, one of the scrapers C may be provided with a number of fingers *c*, corresponding to the number of longitudinal grooves in certain gun-barrels, while the other scraper may be provided with a number of fingers corresponding to the number of spaces between the grooves of the barrel. By virtue of this when inserted in the barrel each of the fingers of one scraper may be made to move in a groove of the barrel and each of the fingers of the other scraper may be made to move in a space between the grooves. The free ends of the fingers c may also be slightly curved, as illustrated, so as to conform to the curvature of the wall of the gun-barrel.

Having described my invention, what I claim is—

The gun and rifle cleaning implement described, consisting essentially of the shank and the scrapers C, carried by the shank and respectively comprising a thimble secured on the shank, the plurality of flat spring or resilient fingers c arranged edge to edge around the shank and abutting at their lower ends against the thimble and bent or curved outwardly so as to enable their free ends to engage a gun barrel, a wire wrapped tightly about the lower portions of the fingers at the side of the thimble so as to secure them on the shank, and the covering e of solder over the wire wrapping and thimble, substantially as and for the purpose set forth.

In testimony whereof I affix my signature in presence of two witnesses.

JOHN F. SCHULHOFF.

Witnesses:
EDWARD SOETBEER,
LOUIS SOETBEER.